No. 777,677. PATENTED DEC. 20, 1904.
P. A. KETTERING.
AUTOMATIC GAS DANGER SIGNAL.
APPLICATION FILED FEB. 16, 1904.
NO MODEL.
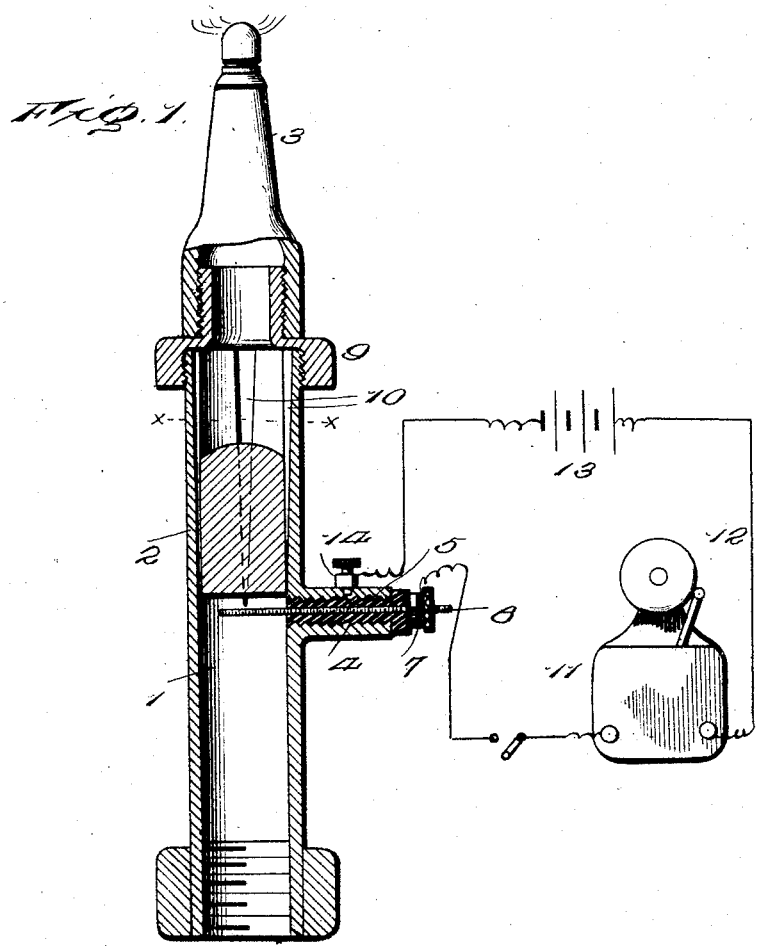
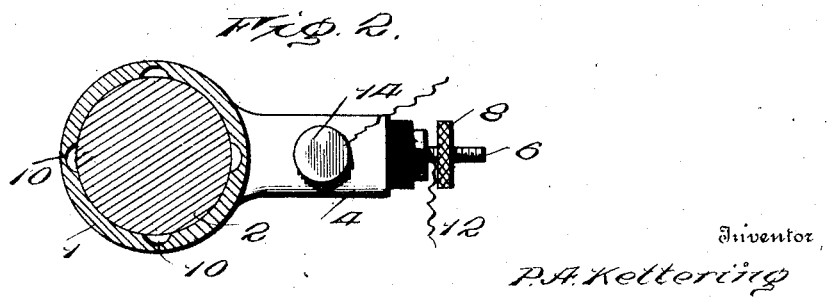
Witnesses
W. N. Woodson
Emily H. England
Inventor
P. A. Kettering
By R. A. Lacey, his Attorneys No. 777,677.  Patented December 20, 1904.

UNITED STATES PATENT OFFICE.

PRESTON A. KETTERING, OF CADIZ, OHIO.

AUTOMATIC GAS DANGER-SIGNAL.

SPECIFICATION forming part of Letters Patent No. 777,677, dated December 20, 1904.

Application filed February 16, 1904. Serial No. 193,878.

*To all whom it may concern:*

Be it known that I, PRESTON A. KETTERING, a citizen of the United States, residing at Cadiz, in the county of Harrison and State of Ohio, have invented certain new and useful Improvements in Automatic Gas Danger-Signals, of which the following is a specification.

This invention has for its object to sound an alarm in the event of the fluid, such as gas, in a service or other line of piping being cut off or the pressure falling below a predetermined point from any cause, whereby ample opportunity may be afforded for closing outlets, such as burners, and admitting of the evil being remedied.

The invention is designed most especially for use in connection with gas-fixtures to give warning and prevent the casualties resulting from open burners, both as regards destruction of property and loss of life by asphyxiation or otherwise.

The invention contemplates a weight loosely mounted in a tube, said weight serving both to cut off the flow of gas or fluid through the tube and to establish the alarm-circuit under dangerous or abnormal conditions.

The invention consists, essentially, of the details of construction, which hereinafter will be more particularly set forth, and illustrated in the drawings hereto attached, in which—

Figure 1 is a detail view of a tube embodying the invention. Fig. 2 is a plan section on the line X X of Fig. 1.

Corresponding and like parts are referred to in the following description and indicated in both views of the drawings by the same reference characters.

The tube 1 may be of brass or any material and of any diameter according to the specific amount of work or flow of gas desired. The bore of the tube 1 is perfectly smooth to admit of free movement therein of the weight 2, which may be of brass or other metal. The tube 1 is included in the service-pipe or the various branches thereof or may be a part of the fixture to which the burner 3 is applied. The location of the tube is immaterial, so long as it serves in connection with the coöperating parts to sound an alarm when the pressure of gas is cut off or reduced. A tubular extension 4 projects laterally from a side of the tube 1 and may be a part thereof or applied thereto, and this extension receives a tube 5, of hard rubber or other insulating material, which is threaded or otherwise fitted into the tubular extension 4, so as to make a positive and close joint therewith. A rod 6 is inserted through the tube 5 and projects into the space of the tube 1 across the path of the weight 2 to form a support therefor and limit its downward movement when the pressure of gas is cut off or falls below the normal. The part 6 is of metal and is threaded or otherwise connected to the tube 5, and its projecting end is threaded and receives a metal washer 7 and nut 8.

The lower end of the tube 1 is internally threaded and the upper end is externally threaded to receive the reducer 9, to which the burner 3 or other fixture or device may be coupled. A series of grooves 10 are formed in the walls of the upper portion of the tube 1 and gradually increase in depth and width from their inner to their upper or outer ends, the inner or lower ends merging into the walls of the tube 1 about in the plane of the tubular extension 4. These grooves 10 form passages or ducts for the by-pass of the gas or fluid around the weight 2 under normal conditions. When the weight 2 is resting upon the inner end of the rod 6, the passages 10 are closed and no gas or fluid can pass through the tube; but when the gas or fluid is under pressure the weight 2 is lifted a distance to expose the lower ends of the grooves or passages 10, thereby permitting the gas to enter the lower ends of said passages and pass upward and by the weight 2 into the upper portion of the tube, thence to the burner or other required point of use.

To give warning when the gas is shut off, an alarm-circuit is provided and includes an electric bell 11 of ordinary construction, the line-wire 12, and battery 13. One terminal of the line-wire is connected to the tubular extension 4 by means of a binding-post 14 and the other terminal is connected to the rod 6 by being clamped between the washer 7 and nut 8. Inasmuch as the rod 6 is electrically insulated from the tube 1 and extension 4, the circuit is broken when the weight is raised; but when the weight comes in contact with the inner end of the rod 6 the circuit is closed and the alarm sounded, thereby giving warning of the reduced pressure for shutting off of the gas, whereby opportunity may be afforded to close the burners or outlets, so as to prevent the escape of gas into the room or apartment with the attendant fatalities.

A switch 15 is arranged in the circuit to break the same when the gas is turned off, thereby preventing the continuous ringing of the bell.

Having thus described the invention, what is claimed as new is—

1. In means for indicating the reduction of pressure within a pipe, the combination of a tube, a weight movable within the tube and supported by the pressure under normal conditions, and an electric alarm-circuit adapted to be closed by and through the weight when the pressure falls below that sufficient to support the said weight, substantially as described.

2. In means for indicating the reduction of pressure within a pipe, the combination of a tube, a weight movable within the tube and supported by the pressure under normal conditions and adapted to control the flow of the liquid through the tube, an electric alarm mechanism having said weight constituting a movable terminal, and a stop projected across the path of the weight and forming the other terminal of the electric circuit, substantially as described.

3. In combination, a tube, a rod extended into the tube and electrically insulated therefrom, a weight movable within the tube, a by-pass between the weight and tube adapted to be closed by the weight when supported by means of the rod and adapted to be opened when the weight is raised by the fluid-pressure, and an electric alarm-circuit having the terminals connected with, respectively, the tube and the aforesaid rod and adapted to be closed by and through the said weight, substantially as set forth.

In testimony whereof I affix my signature in presence of two witnesses.

PRESTON A. KETTERING. [L. S.]

Witnesses:
J. G. COIL,
R. H. MINTEER.